Sept. 30, 1930.  D. F. DOMIZI  1,776,891
MOTOR VEHICLE AXLE CONSTRUCTION
Filed Dec. 5, 1927
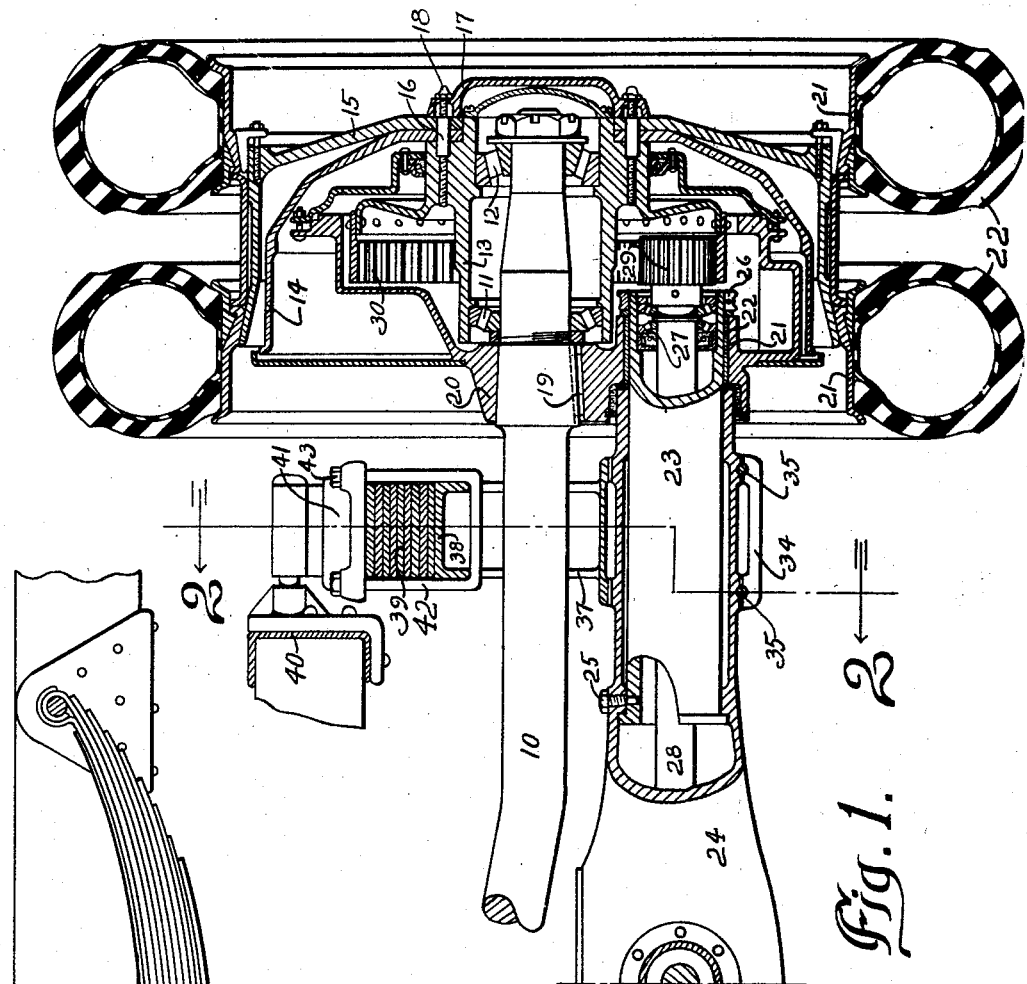
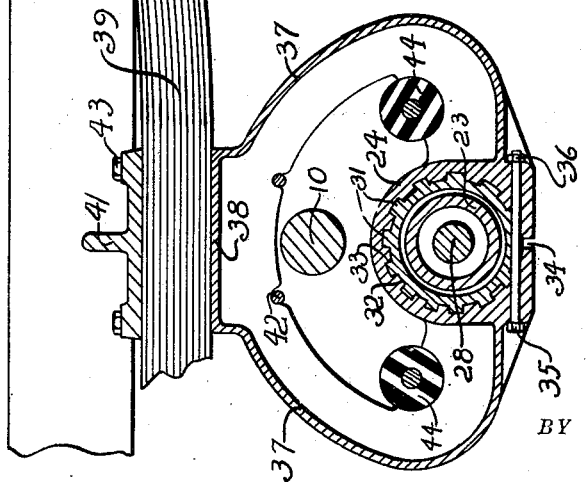
INVENTOR
DAVID F. DOMIZI
BY
*Jhing Harness*
ATTORNEY Patented Sept. 30, 1930

1,776,891

UNITED STATES PATENT OFFICE

DAVID F. DOMIZI, OF LIMA, OHIO, ASSIGNOR TO RELAY MOTOR PRODUCTS CORPORATION, A CORPORATION OF DELAWARE

MOTOR-VEHICLE AXLE CONSTRUCTION

Application filed December 5, 1927. Serial No. 237,696.

This invention relates to axle constructions for motor vehicles and the like and relates to means for securing spring perches to such axles, the principal object being the provision of new and novel means for use in this connection.

Another object is to provide means for positively locking a spring perch against rotation to a vehicle axle.

A further object is to provide an axle with splines formed thereon and providing a spring perch to be secured to the axle with a surface complementary to such splines, the spring perch being clamped to the axle with the aforementioned complementary surface in contact with the splines.

The above being among the objects of the present invention the same consists in certain features of construction and combinations of parts to be hereinafter described with reference to the accompanying drawings, and then claimed, having the above and other objects in view.

In the accompanying drawing which illustrates a suitable embodiment of the present invention, Fig. 1, is a vertical sectional view taken centrally through a rear axle for a motor vehicle.

Fig. 2, is a sectional view taken on the line 2—2 of Fig. 1.

In the drawing I show the present invention in connection with a vehicle rear axle of the tread mill type, the action of which is described in my application for Letters Patent of the United States on motor vehicle construction, filed on January 7, 1927, Serial No. 159,597, and in which the load carrying housing is rotatable relative to the wheel axle whereby when an obstruction or other unusual resistance is met by the wheels the axle housing with the load carried thereby is caused to move forwardly and up with respect to the wheel axle whereby an increased leverage is caused to act in the same manner as in a tread mill to aid the wheel in overcoming the obstruction or resistance.

As shown in the drawing the construction includes a wheel axle 10 to the outer end of which is rotatably secured on the bearings 11 and 12 a hub 13. A brake drum 14 and a wheel 15 are secured to the hub 13 by means of a bolt 16, cap 17 and nuts 18. Non-rotatably secured to the axle 10 by taper fit and a key 19 is a supporting member 20 which serves to support the brake bands and other braking mechanism (not shown) and for other purposes which will be presently described.

The wheel 15 has secured thereto the rims 51 which in turn receive the tires 52. The supporting member 20 is provided with an opening 21 having a bushing 22 in which is rotatably received the sleeve 23 which is secured against rotation and axial movement in the axle housing 24 by the pin 25 and nut 26.

Rotatably received with the housing 24 and sleeve 23 in the bearings 27 is an axle shaft 28 to the outer end of which is secured the pinion 29. An internal gear 30 is secured to the hub 13 in meshing relationship with the pinion 29 so that upon rotation of shaft 28 the pinion 29 acting on the gear 30 will cause rotation of the wheels. The housing 24 immediately inwardly of the inner line of the tires 22 is provided with a plurality of axially extending outwardly projecting splines 31 on its exterior surface and extending circumferentially around the same. A spring perch is provided with a central opening 32 which is grooved as at 33, which grooves are adapted to receive the splines 31 on the housing 24. The perch is axially split on the lower side into the opening 32 as at 34 and bolts 35 are provided through the split side in intersecting relationship with respect to the splines 33, nuts 36 being provided on the bolts 35 for drawing the split 34 together and thereby clamping the perch secured to the housing 24. The perch is provided with integral arms 37 which extend horizontally outwardly from the portion which is received on the axle housing and then upwardly and inwardly over the wheel axle 10 over which they join to form a spring seat 38 for the load carrying springs 39, the outer ends of which (not shown) are secured to the frame side members 40 of the vehicle chassis by conventional shackles or other suitable means. A clamping plate 41 and U-bolts 42 and nuts 43 serve to secure the springs 39 against movement to the seat 38. Resilient blocks such as 44 are supported by the arm portions 37 in the path of movement of the wheel axle 10 relative to the center of the axle 28 in order to cushion the blow of the wheel axle 10 against the arms 37 when the arms 37 act to limit the swinging movement of the axle housing relative to the center of the wheel axle 10.

It will be obvious that in constructions of this type the load carrying springs 39 acting through the perches 37 serve to maintain the housing 24 from rotating relative to the axle 28, this being necessary in order to keep the differential mechanism (not shown) carried by the axle 24 and the propeller shaft (not shown) in alignment during swinging movement of the axle housing.

In view of the great leverage between the point of connection of the spring perch to the axle housing and the point of support for the springs 39, an enormous strain is sometimes put on the connection between the perch and the axle housing and the construction herein provided is such as to withstand such strains without liability of displacement of the spring perch circumferentially of the axle housing.

Formal changes may be made in the specific embodiment of the invention described without departing from the spirit or substance of the broad invention, the scope of which is commensurate of the appended claims.

What I claim is:

1. In combination, a wheel axle, wheels mounted thereon, an axle housing supported from said wheel axle in eccentric relationship in respect thereto and normally below the same, a spring perch secured to said axle housing and extending upwardly in spaced relationship in respect to said wheel axle, and a load carrying spring secured to said perch above said wheel axle, said axle being provided with a plurality of radially outwardly projecting splines and said spring perch being provided with a surface complementary to the splined portion of said housing and secured thereto.

2. In combination, a wheel axle, an axle housing supported from said wheel axle in eccentric relationship thereto and normally positioned below the same, said axle housing being provided with a plurality of axially extending outwardly projecting splines disposed around the circumference thereof, a spring perch provided with an opening formed to present a surface complementary to the splined portion of said axle housing and received thereon, said perch extending upwardly from said axle housing in normally spaced relationship to said wheel axle, and a load carrying spring secured to said perch at a distance from said axle housing greater than the eccentricity of said axle in respect to said housing.

DAVID F. DOMIZI.